T. J. Rowley & W<sup>m</sup> Poland.
Link for Locomotives &c.
Fig. 1.  72231  Fig. 2.
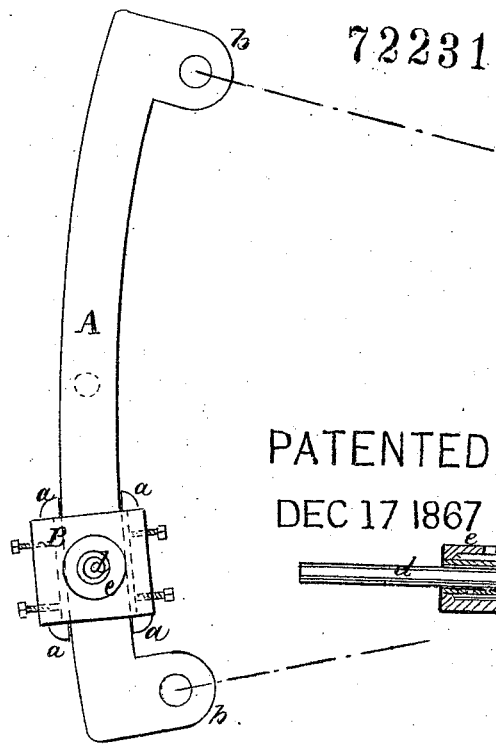
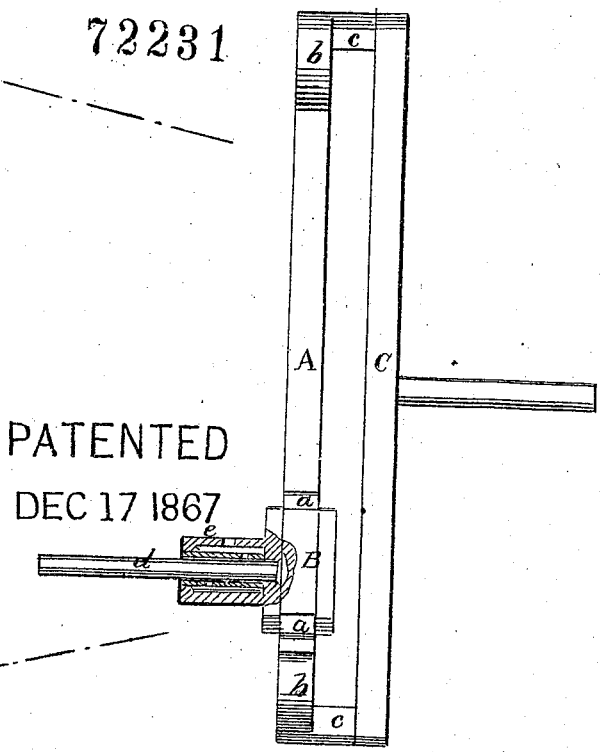
PATENTED
DEC 17 1867
Witnesses.  Inventor.

United States Patent Office.

THOMAS J. ROWLEY AND WILLIAM POLAND, OF CHILLICOTHE, OHIO.

Letters Patent No. 72,231, dated December 17, 1867.

IMPROVED LOCOMOTIVE-LINK FOR TRUCKS.

*The Schedule referred to in these Letters Patent and making part of the same.*

TO ALL WHOM IT MAY CONCERN:

Be it known that we, THOMAS J. ROWLEY and WILLIAM POLAND, of Chillicothe, in the county of Ross, and State of Ohio, have invented a new and useful Improvement in Locomotive-Link; and we do hereby declare that the following is a full, clear, and exact description thereof, which will enable others skilled in the art to make and use the same, reference being had to the accompanying drawings, forming part of this specification.

Figure 1 represents a front view of the link-bar.

Figure 2, a side view.

Similar letters of reference indicate corresponding parts.

This invention relates to an improvement in the construction of links for locomotive and other engines, and consists in a link, formed of a single bar, on which the box slides, which bar is stiffened by a side bar connected with the tumbling-shaft.

By this construction the link is made much cheaper than double bars for the box to slide on, as the work is all external, and the link is much lighter, stronger, and more durable. A is the link or radius-bar on which is fitted the slide-box B, which is secured tight upon it by gibs $a\ a$, both of which are provided with set-screws for tightening up to compensate for wear, which may be done readily by the engineer, when necessary, instead of taking the work to the shop, as usual. At the ends of the link are formed bosses $b\ b$, for connecting with the eccentrics. A stiffening-bar or bridge, C, is made fast to the ends of the link A, with blocks $c\ c$ between, to set it out clear of the slide-box B. The wrist-pin I is provided with a lubricating-box, $e$.

Having thus described our invention, what we claim as new, and desire to secure by Letters Patent, is—

The link or radius-bar A, combined with the slide-box B and the stiffening-bar C, constructed as and for the purpose herein described.

THOMAS J. ROWLEY,
WM. POLAND.

Witnesses:
FRANK HELLMAN,
STEPHEN O. HAND.